(12) United States Patent
Alpha

(10) Patent No.: US 7,191,116 B2
(45) Date of Patent: Mar. 13, 2007

(54) METHODS AND SYSTEMS FOR DETERMINING A LANGUAGE OF A DOCUMENT

(75) Inventor: Shamim A Alpha, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1035 days.

(21) Appl. No.: 09/884,403

(22) Filed: Jun. 19, 2001

(65) Prior Publication Data

US 2003/0009324 A1   Jan. 9, 2003

(51) Int. Cl.
*G06F 17/20* (2006.01)
(52) U.S. Cl. .................. 704/8; 704/2; 704/9; 704/10
(58) Field of Classification Search ............... 704/2–8
See application file for complete search history.

(56) References Cited

U.S. PATENT DOCUMENTS

| | | | | |
|---|---|---|---|---|
| 6,002,998 A | * | 12/1999 | Martino et al. | 704/9 |
| 6,047,251 A | * | 4/2000 | Pon et al. | 704/1 |
| 6,125,362 A | * | 9/2000 | Elworthy | 707/6 |
| 6,415,250 B1 | * | 7/2002 | van den Akker | 704/9 |

* cited by examiner

*Primary Examiner*—Richemond Dorvil
*Assistant Examiner*—Lamont Spooner
(74) *Attorney, Agent, or Firm*—McDonald Hopkins Co., LPA

(57) ABSTRACT

A system and method for determining the language of an unknown document is provided. For a set of candidate languages, a negative assumption is set for each candidate language that the document is not that language and the system attempts to prove the negative assumption is wrong. If the negative assumption fails for one language, then the document is identified as being in that language. The present system and method provides a higher degree of accuracy when determining the language of a document.

19 Claims, 4 Drawing Sheets

METHODS AND SYSTEMS FOR DETERMINING A LANGUAGE OF A DOCUMENT

FIELD OF THE INVENTION

The invention relates to the computerized language detection arts. It finds particular application to a method and system of determining the language of a text document. It will be appreciated that the invention will also find application to information retrieval engines or other document search engines.

BACKGROUND OF THE INVENTION

With the expansion of global computer networks, users can search for and gather documents from many sources many of which maybe unknown and often unmanaged sources. The language of documents found is not necessarily known a priori.

Traditional language detection techniques try to answer what are the chances that a document is in a given language. This answer is computed in isolation irrespective of what other languages the document could possibly be. Prior methods try to determine if documents in a given language will also have similar N-gram or small word distribution.

If the languages in a candidate list are significantly different from each other, the traditional technique works reasonably well. However, when languages are very similar to each other, many false positives are obtained.

The present invention provides a method and system for detecting the language of an unknown text that cures the above problems and others.

SUMMARY OF THE INVENTION

According to one embodiment of the present invention, a system for automatically determining a language of a document from a set of candidate of languages is provided. The system includes logic that sets a negative assumption value indicating the document is not one of the candidate languages. An extractor then extracts a character string from the document. A language analyzer determines a probability value that the character string does not belong to the candidate languages and the negative assumption value is adjusted based on the probability value. The language analyzer determines that the document is one language of the candidate languages when the negative assumption value passes a threshold value.

In accordance with a more limited aspect of the present invention, the system further includes an information retrieval engine that retrieves documents in response to a search request. The documents retrieved being analyzed by the language analyzer to determine their language.

In accordance with another embodiment of the present invention, a method of determining a language of a document from a set of candidate languages is provided. A null hypothesis is set to a true value for each candidate language indicating the document is not in the candidate language and a false value is set. A text string is extracted from the document and a contrary probability is determined for each candidate language that the text string does not belong to the candidate language. The null hypothesis is then adjusted for each candidate language with the contrary probability corresponding to the candidate language. The document is determined to be one language from the candidate languages when the null hypothesis for the one language is disproved by approaching the false value.

In accordance with another embodiment of the present invention, a process of determining that a document is in a selected language is provided. The process includes setting a probability assumption indicating that the document in not in the selected language. A character string is extracted from the document. The probability assumption is then disproved based on a contrary probability that the character string does not belong to the selected language such that if the contrary probability fails to support the probability assumption, then the document is determined as being in the selected language.

One advantage of the present invention is that it increases the accuracy of determining the language of a document.

Another advantage of the present invention is that it does not determine probabilities that characters belong to a language based on an isolated view of only that language. Rather, it determines probabilities that characters belong to a language based on how those characters belong to all candidate languages.

Still further advantages of the present invention will become apparent to those of ordinary skill in the art upon reading and understanding the following detailed description of the preferred embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

The following includes definitions of exemplary terms used throughout the disclosure. Both singular and plural forms of all terms fall within each meaning:

"Document", as used herein, includes but is not limited to an electronic document, a web page or any object having text.

"Software", as used herein, includes but is not limited to one or more computer executable instructions, routines, algorithms, modules or programs including separate applications or ones from dynamically linked libraries for performing functions as described herein. Software may also be implemented in various forms such as a servlet, an applet, a stand-alone program including a server based application and a user based application, a plug-in or other type of application. Software may also be stored on various computer readable mediums such as disk, CD, tape, memory and can be downloadable.

"Logic", as used herein, includes but is not limited to hardware, software and/or combinations of both to perform one or more functions.

"Network", as used herein, includes but is not limited to the internet, intranets, Wide Area Networks (WANs), Local Area Networks (LANs), and transducer links such as those using Modulator-Demodulators (modems).

"Internet", as used herein, includes a wide area data communications network, typically accessible by any user having appropriate software.

"Intranet", as used herein, includes a data communications network similar to an internet but typically having access restricted to a specific group of individuals, organizations, or computers.

Figure 1:
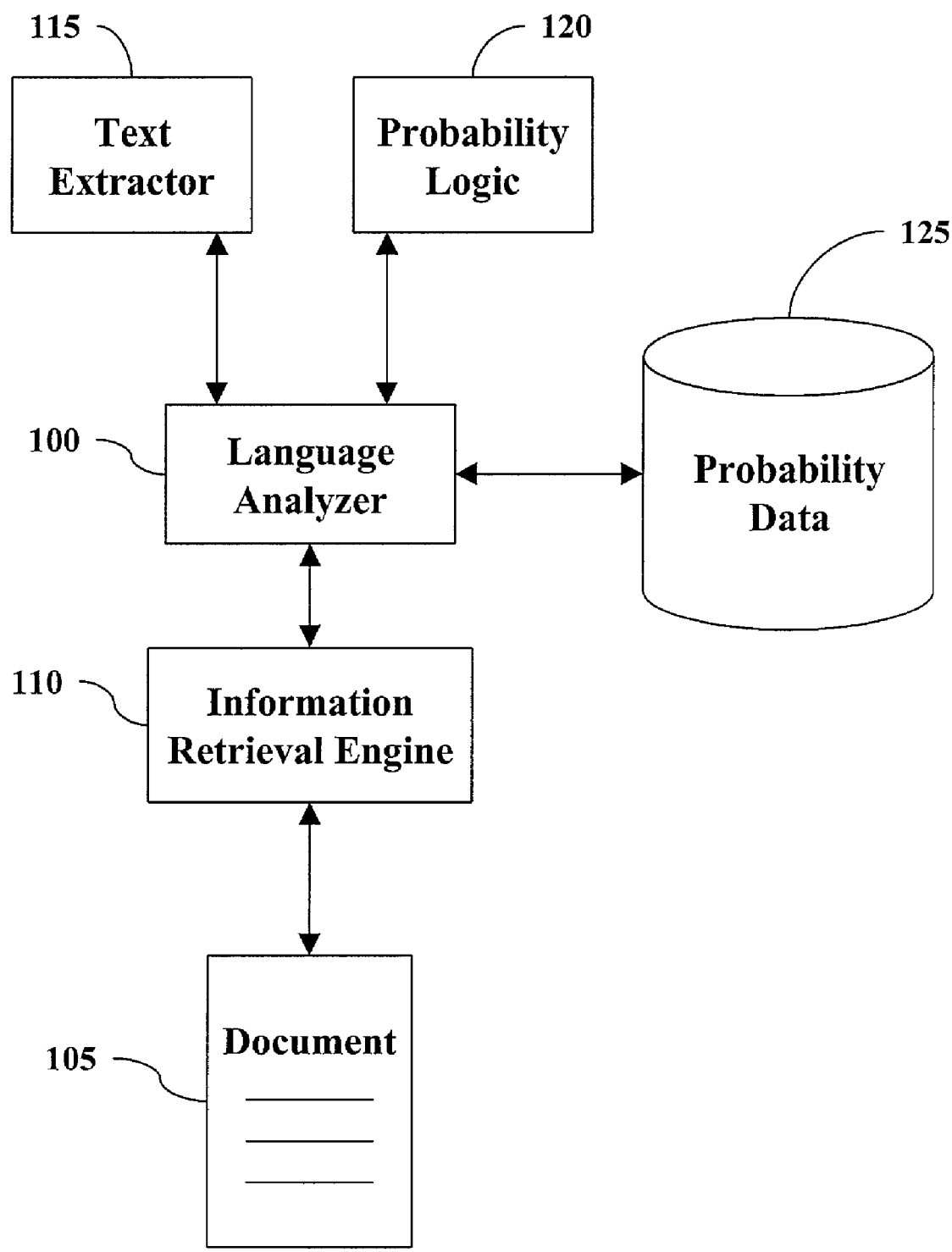
FIG. 1 is an exemplary overall system diagram of a language analyzer in accordance with the present invention.

Illustrated in FIG. 1 is an exemplary system diagram in accordance with the present invention. The system is embodied as software and includes a language analyzer 100 that determines the language of text from a document 105. In one embodiment, the language analyzer 100 is a component within an information retrieval engine 110 or is called by the engine 110 when a document is retrieved or identified by the engine. The information retrieval engine 110 is, for example, Oracle Text, made by Oracle Corporation or any type of search engine or document retrieval system as is known in the art.

Briefly describing the system, a text extractor 115 searches for and extracts a portion of text from the document 105 for analysis. For a given set of candidate languages, a probability logic 120 sets a null hypothesis representing "true" that negatively assumes the document 105 is not in any of the given languages. The language analyzer then tries to refute the assumption by trying to prove the null hypothesis is "false". In other words, the negative assumption starts with a probability estimate for each candidate language of a 100% value that the document is not English, is not French, is not Spanish, etc. Predetermined probability data 125 (described below) is used to adjust the probability estimate for each language based on a probability that the extracted text does not belong to the language. Once the probability estimate for one of the languages falls below a selected threshold, its negative assumption fails. Thus, the document is most likely in that language because the attempt to prove the contrary has failed. At that point, the system determines that too much evidence contrary to the null hypothesis is found such that the probability estimate supporting the null hypothesis is minuscule. If the threshold is not passed, iteration logic within the language analyzer 100 repeats the process with another extracted portion of text.

Figure 2:
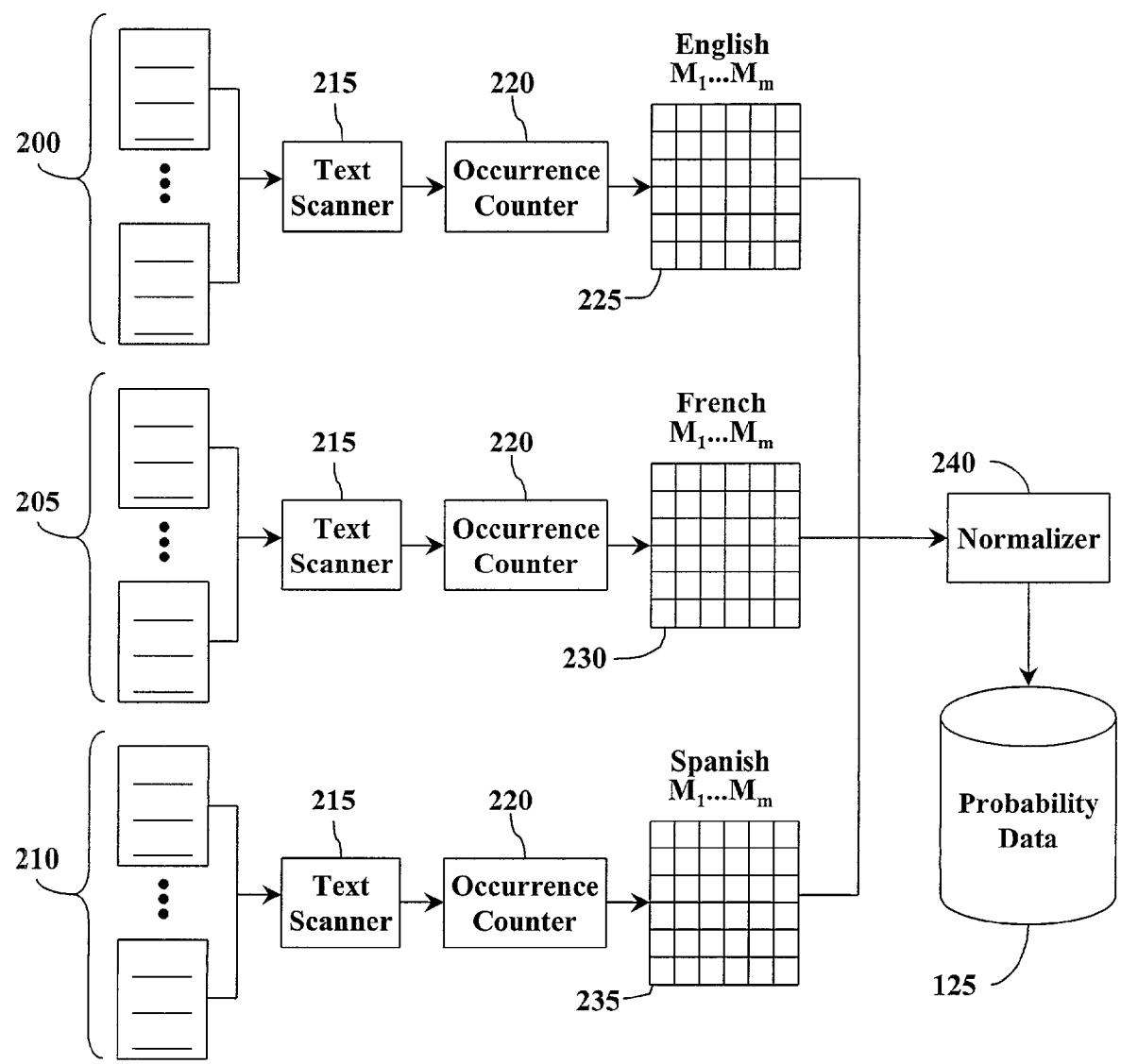
FIG. 2 is an exemplary diagram showing how probability data is generated in accordance with the present invention.

Illustrated in FIG. 2 is a system and process for generating the probability data 125 that is formed as, for example, one or more data tables or databases. The probability data is generated for a selected set of languages, for example, European languages. To describe the invention, English, French and Spanish are the selected languages but any number can be selected. For each language, a sample set of documents are selected for analysis, e.g. English documents 200, French documents 205 and Spanish documents 210. Each sample set of documents may include hundreds or thousands of documents or more. When the probability data 125 is completed, it will contain probability values that a string of text occurs within a language based on its occurrences in all the languages.

With reference to the English documents 200, a software text scanner 215 searches the text of each document and extracts sequential strings of characters. Each extracted string has a predetermined size, for example, three characters. An occurrence counter 220 includes logic that counts the number of occurrences of each extracted string within the set of English documents 200. The number of occurrences for each extracted string is then stored in an occurrence table 225 for English. For example, if an extracted string "ace" occurs five (5) times, that value is stored in the table 225. This process repeats for other three letter strings throughout the set of English documents 200 using iteration logic.

With further reference to FIG. 2, the French documents 205 and Spanish documents 210 are also inputted to the text scanner 215. A corresponding French occurrence table 230 and Spanish occurrence table 235 are generated having occurrence values of three letter strings. Using "ace" as an example, it may have occurred two hundred (200) times in the French documents and fifty (50) times in the Spanish documents. Those values are then stored in the French table 230 and the Spanish table 235, respectively.

A normalizer 240 includes logic that normalizes each occurrence value for each string based on the same string's occurrence values in all the selected languages, e.g. from all the occurrence tables 225, 230 and 235. In this manner, the system does not determine probabilities that characters belong to a language based on an isolated view of only that language. Rather, it determines probabilities that characters belong to a language based on how those characters belong to all candidate languages. The normalized value for a string becomes the probability that a document is in a language given that the string is found in the document. Each occurrence value is normalized as shown in Equation (1):

$$P_{iEng}(xxx) = \frac{M_{iEng}(xxx)}{M_{iEng}(xxx) + M_{iFren}(xxx) + M_{iSpan}(xxx)} \quad (1)$$

$M_{iEng}(xxx)$ is the number of occurrences of a string "xxx" found in the English occurrence table 225. $M_{iFren}(xxx)$ and $M_{iSpan}(xxx)$ are the number of occurrences of the same string "xxx" found in the French and Spanish occurrence tables 230 and 235, respectfully. In other words, based on the occurrence tables, if "ace" occurred 5 times in English, 200 times in French and 50 times in Spanish, using maximum likelihood estimate, the normalized probability $P_{iEng}$(ace) that a document is English given that "ace" is found is 5/(5+200+50) or approximately 0.02 (2%). Normalized probabilities are also determined for French and Spanish entries of "ace" as $P_{iFren}$(ace)=200/(5+200+50) or approximately 0.78 (78%) and $P_{iSpan}$(ace)=50/(5+200+50) or approximately 0.20 (20%). Using an iterative process, the normalizer 240 computes these normalized probabilities for all occurrence values from tables 225, 230 and 235 and stores them as the probability data 125. Thus, the probability data 125 associated with a string of text "xxx" is influenced by the occurrences of "xxx" in all selected languages.

The probability data 125 may be configured in many ways as will be appreciated by one of ordinary skill in the art. For example, each string can be used as a key index for each candidate language. In this manner, the probability data 125 is searchable by the string to retrieve its corresponding probability value. In another embodiment, each string may be used to obtain an index value, by using a hashing function or the like, that associates the string to a value in the probability data 125 for each candidate language.

Figure 3:
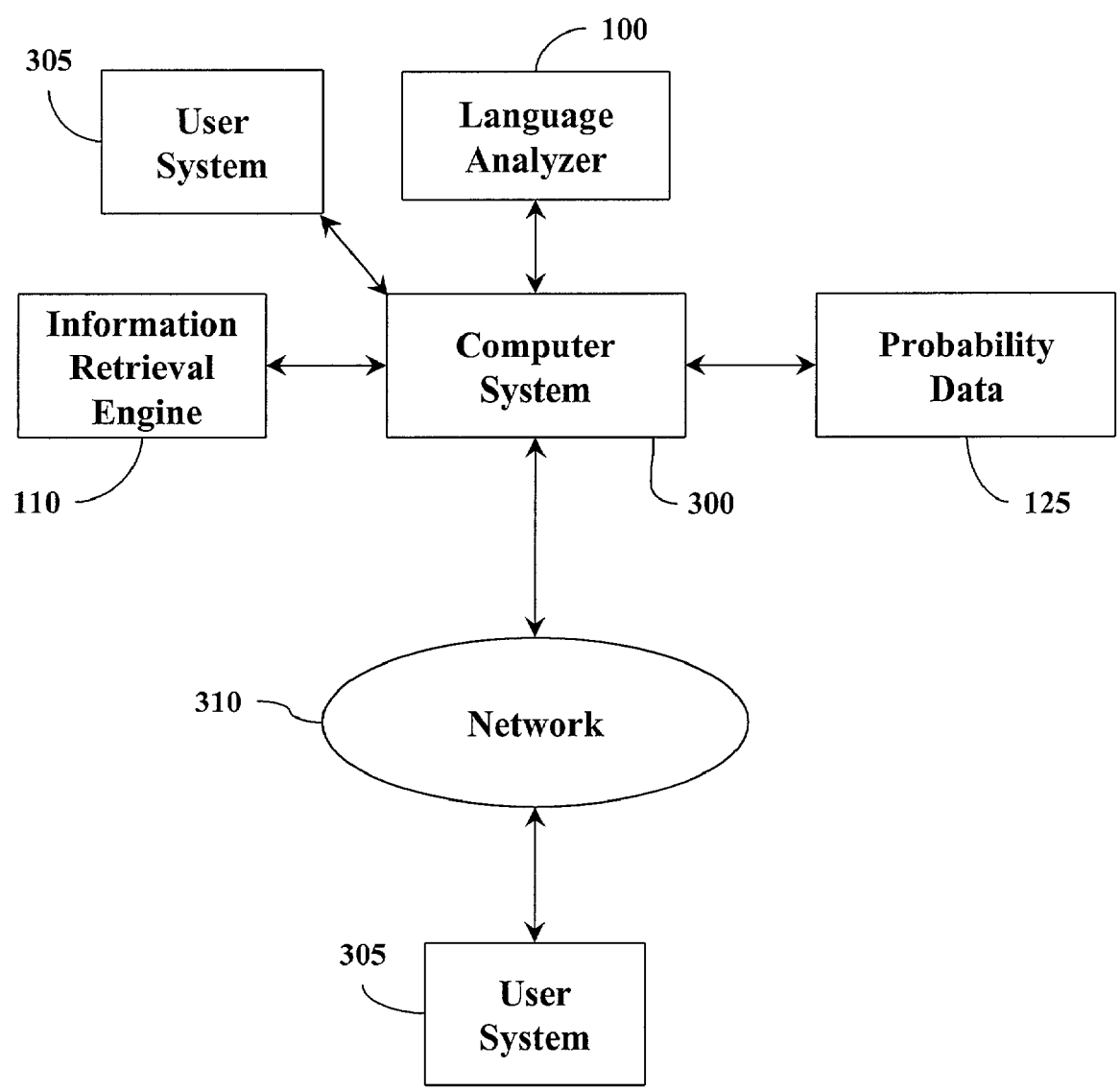
FIG. 3 is an exemplary system using the present invention.

Illustrated in FIG. 3 is an exemplary system diagram showing an application of one embodiment the invention. A computer system 300 receives document search requests from one or more user systems 305 connected thereto via a network 310 or by direct connection. The computer system 300 executes an information retrieval engine 315 to locate candidate documents that match the search request to a selected degree as is known in the art. Since one or more of the candidate documents may be retrieved from unknown sources, the language analyzer 100 is executed to determine the language of any document using the probability data 125 as described above.

Generally, the computer system 300 may take many forms from a configuration including a variety of processing units networked together to function as a integral entity, to a single computer, e.g. a personal computer, operational in a stand-alone environment. The present invention can be embodied in any of these computer system configurations.

Figure 4:
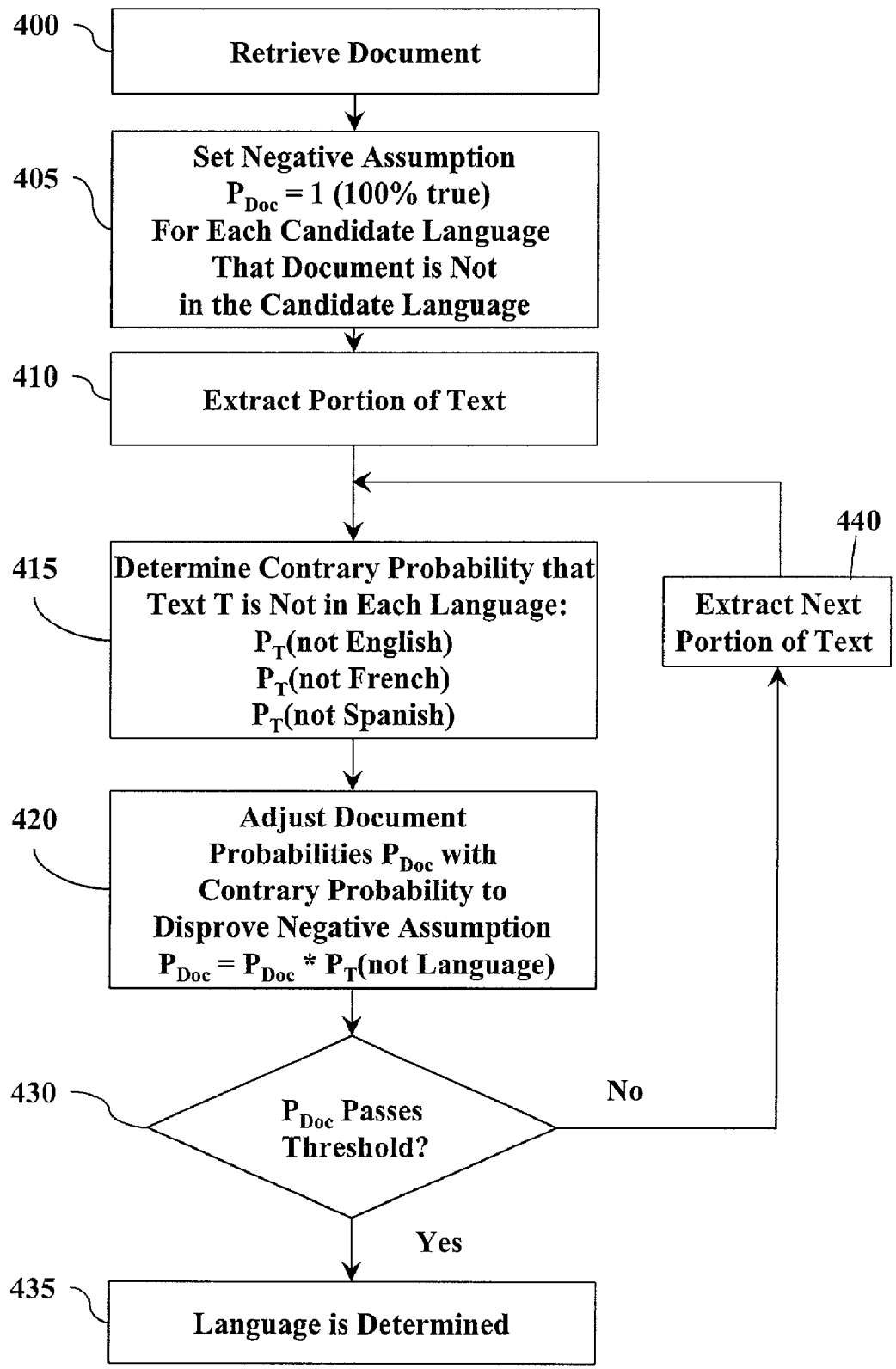
FIG. 4 is an exemplary methodology of determining the language of a document in accordance with the present invention.

Illustrated in FIG. 4 is an exemplary computer-implemented methodology of the language analyzer 100 that detects the language of a document in accordance with the present invention. The blocks shown represent functions, actions or events performed therein. It will be appreciated that computer software applications involve dynamic and flexible processes such that the illustrated blocks can be performed in other sequences different than the one shown. It will also be appreciated by one of ordinary skill in the art that the software of the present invention may be implemented using various programming approaches such as procedural, object oriented or artificial intelligence techniques.

With reference to FIG. 4, a document is retrieved in response to a search request (block 400). It will be appreciated that the document might not be physically received but rather its location can be simply identified. A negative assumption is set (block 405) for each candidate language that the document is not that language and the analysis attempts to prove the negative assumption wrong. If the negative assumption fails for one language, then the document is identified as being in that language.

The negative assumption sets a probability estimate $P_{doc}$ at "1" (100% true value) for each language that the document is not in that language:

$$P_{doc}(\text{not English})=1$$

$$P_{doc}(\text{not French})=1$$

$$P_{doc}(\text{not Spanish})=1$$

The document is then searched and a portion of text T is extracted (block 410). The text, in this case, is a three character string since the probability data 125 was generated based on three letter strings. If a different string length is used for the probability data 125, the same length would be extracted here. To simplify the explanation, assume that the first extracted string is "ace" as used above. The probability data 125 is then searched for an entry matching "ace" in each of the languages (block 415). The probability data 125 returns a probability value for each language that reflects the probability that the document is that language given the occurrence of the string "ace". The probabilities, as taken from the above example, are as follows:

$$P_{Eng}(\text{ace})=0.02$$

$$P_{Fren}(\text{ace})=0.78$$

$$P_{Span}(\text{ace})=0.20$$

These probabilities are then reversed or made contrary (e.g. subtracted from 1) to obtain a probability that the document is not in the language given the occurrence of the string "ace" (block 420). The contrary probabilities become:

$$P_{notEng}(\text{ace})=0.98$$

$$P_{notFren}(\text{ace})=0.22$$

$$P_{notSpan}(\text{ace})=0.80$$

The above contrary probabilities state that given the occurrence of the string "ace" there is a 98% probability that the document is not English, a 22% probability that the document is not French, and an 80% probability that the document is not Spanish. It will be appreciated that the probability data 125 can be generated to contain the contrary probabilities for each string, thus, eliminating this step here.

The probability estimate $P_{doc}$ is then adjusted for each language based on the contrary probabilities of the current extracted string "ace" (block 425). In the below equations, it will be understood that the values to the right of the "=" represent a value "before" execution of the equation and the values to the left of the "=" represent the value "after" execution as known in computer processing. The adjusted values are found by:

$$P_{doc}(\text{not English})=P_{doc}(\text{not English})*P_{notEng}(\text{ace}) \quad (2)$$

$$P_{doc}(\text{not French})=P_{doc}(\text{not French})*P_{notFren}(\text{ace}) \quad (3)$$

$$P_{doc}(\text{not Spanish})=P_{doc}(\text{not Spanish})*P_{notspan}(\text{ace}) \quad (4)$$

By multiplying the probability estimate with the contrary probability for the current string, the probability estimate will stay near "1" (meaning the negative assumption is true and the document is probably not in that language) or approach "0" (meaning the negative assumption is false and the document is probably in that language). With $P_{doc}$(not language) initially equal to "1", after a first adjustment, the probability estimate $P_{doc}$ becomes:

$$P_{doc}(\text{not English})=0.98$$

$$P_{doc}(\text{not French})=0.22$$

$$P_{doc}(\text{not Spanish})=0.80$$

After the first iteration, the negative assumption for French is closer to failing (e.g. approaching "0") than the other languages. Thus at this point, there is a greater probability that the document is French. The analysis continues by comparing the current probability estimates to a selected threshold value (block 430) that is near "0" (a false value), for example 0.001. Of course, any threshold value may be chosen depending on the accuracy desired (e.g. 0, 0.01, 0.5, 0.1, etc.). Once the probability estimate $P_{doc}$ for one language falls below the threshold, the document is determined to be in that language and the analysis stops (block 435). If the threshold is not passed, the analysis continues by extracting the next three letter string from the document and repeating the process (block 440).

Assuming that the next extracted string is represented by "xxx", the process performs a second iteration. With reference to Table (1) below, we assume that "xxx" has the shown contrary probabilities for not being in a language which are determined from the probability data 125. As described above, the probability estimate $P_{doc}$ is adjusted by the current contrary probabilities for "xxx" by multiplying them together. After the second iteration, the probability estimate $P_{doc}$ for Not French is quickly approaching zero which means the document is probably French. The process continues if the threshold value is not passed. In this example, the system is assuming that occurrences of "ace" and "xxx" are independent of each other. Due to this assumption and initial conditions $P_{doc}$(not language)=1, $P_{doc}$(not language) will not strictly reflect the probability of the document not being in that language. Instead, $P_{doc}$(not language) will be useful for comparison between different languages. Hence at any point, $P_{doc}$(not language X)<$P_{doc}$(not language Y) implies that the document is more likely to be in language X than in language Y.

TABLE (1)

| Iteration | Not English | Not French | Not Spanish |
|---|---|---|---|
| 1. Prob(ace) | .98 | .22 | .80 |
| 2. Prob(xxx) | .99 | .30 | .70 |
| $P_{doc}$ | .97 | .066 | .56 |

Combining the probabilities of each iteration is based on a principle that there is a relationship between phrases in a given language. For example, if a document is known to be in English and the phrase "you" occurs, then there is a greater probability that the phrase "ion" will also occur since it is common in English. This relationship principle is used by the analysis as described above when trying to prove or disprove the negative assumption. Thus when "ace", which has a low probability (0.22) of not being French, is found in an unknown document, the failure of the negative assumption that the document is not French is further supported by subsequently finding another string "xxx" which also has a low probability (0.3) of not being French.

The present invention determines the language of an unknown document by using language specific characteristics of a language as compared to other candidate languages. As described above, probabilities that characters belong to a language are determined based on how those characters belong to all candidate languages rather than taking an isolated view of only one language. In this manner, the present invention provides increased robustness and reduces the probability of false positives.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, the language analyzer may be a feature within a search engine or may be a separate program. Additionally, any string length can be used for the extracted string and any number of candidate languages can be used. The probability data may contain the contrary probabilities in order to eliminate the subsequent determination step. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A system for automatically determining a language of a document from a set of candidate languages, the system comprising:
    a database containing probability data for a plurality of text strings each having a predetermined length equal to each other, each text string of the plurality of text strings having an associated probability value indicating a probability that the text string occurs within a language based on occurrences of the text string in all of the candidate languages;
    logic for setting a negative assumption value for each of the candidate languages indicating the document is not one of the candidate languages;
    an extractor for extracting a character string from the document, the character string having a length equal to the predetermined length of the plurality of text strings contained in the database; and
    a language analyzer for determining a probability value for each of the candidate languages that the character string does not belong to the candidate languages by retrieving the probability value associated to the character string from the database for each or the candidate languages, and includes logic for adjusting the negative assumption value based on the probability value, the language analyzer determining that the document is one language of the candidate languages when the negative assumption value passes a threshold value.

2. The system as set forth in claim 1 further including an information retrieval engine for retrieving documents in response to a search request, the documents retrieved being analyzed by the language analyzer.

3. The system as set forth in claim 1 wherein the logic for adjusting includes logic for combining the negative assumption value with the probability value.

4. The system as set forth in claim 1 wherein to language analyzer further includes iteration logic for causing the extractor to extract another character string from the document if the negative assumption value fails to pass to threshold value.

5. A method of determining a language of a document from a set of candidate languages, the method comprising the steps of:
    setting a null hypothesis to a true value for each candidate language indicating the document is not in the candidate language and setting a false value;
    extracting a text string from the document, the text string having a predetermined length;
    determining a contrary probability for each candidate language that the text string does not belong to the candidate language based on probabilities that the text string belongs to each of the candidate languages where the probabilities are retrieved from a database that stores probability values for a plurality of text strings each having the predetermined length, each text string of the plurality of text strings having an associated probability value for each candidate language indicating a probability that the text string occurs within a language from the candidate languages based on occurrences of the text string in all of the candidate languages;
    adjusting the null hypothesis for each candidate language with the contrary probability corresponding to the candidate language; and
    determining the document is one language from the candidate languages when the null hypothesis for the one language is disproved by approaching the false value.

6. The method as set forth in claim 5 further includes setting a threshold value indicating that the null hypothesis is disproved.

7. The method as set forth in claim 6 further includes repeating the extracting step for a different text string from the document and repeating the method until the null hypothesis is disproved for one of the candidate languages bypassing the threshold value.

8. The method as set forth in claim 5 further includes pregenerating probability data corresponding to each candidate language, the probability data including a probability value for a text string that is normalized based on an occurrence probability of the text string in all the candidate languages.

9. The method as set forth in claim 5 further includes identifying the document based on a search request.

10. The method as set forth in claim 5 wherein the extracting step includes extracting a plurality of sequential characters that form the text string.

11. The method as set forth in claim 5 wherein the setting step includes setting the true value to 1 and setting the false value to 0.

12. The method as set forth in claim 5 wherein the contrary probability for a first candidate language is determined based on a number of occurrences of the text string found in a sample set of documents from the first candidate language which is normalized by a sum of occurrences of the text string found in a sample set of documents from all the candidate languages.

13. A process of determining that a document is in a selected language, the process comprising the steps of:
   setting a probability assumption indicating that the document is not in the selected language;
   extracting a character string from the document; and
   disproving the probability assumption based on a contrary probability that the character string does not belong to the selected language such that if the contrary probability fails to support the probability assumption, then the document is determined as being in the selected language.

14. The process as set forth in claim 13 further includes determining the document is the selected language from a set of candidate languages.

15. The process as set forth in claim 14 further including generating a probability database having a contrary probability for each of a plurality of character strings for each of the candidate languages, where the contrary probability of a character string in one language is determined based on an occurrence frequency of the character string in the one language influenced by a total occurrence frequency of the character string in all the candidate languages.

16. The process as set forth in claim 15 further including determining the occurrence frequency of each character string based on a sample set of documents provided for each of the candidate languages.

17. The process as set forth in claim 15 wherein the contrary probability of the character string in one language is normalized by the total occurrence frequency of the character string in all the candidate languages.

18. The process as set forth m claim 13 further including identifying the document in response to a search request.

19. A computer program product configured to perform the process of claim 13.

* * * * *

UNITED STATES PATENT AND TRADEMARK OFFICE
CERTIFICATE OF CORRECTION

PATENT NO. : 7,191,116 B2
APPLICATION NO. : 09/884403
DATED : March 13, 2007
INVENTOR(S) : Shamin A Alpha It is certified that error appears in the above-identified patent and that said Letters Patent is hereby corrected as shown below:

Col. 2 Line 6, "in" should read -- is --.
Col. 4 Line 37, "respectfully" should read -- respectively --.
Col. 4 Line 62, "embodiment the" should read -- embodiment of the --.
Col. 6 Line 20, "Pnotspan" should read -- PnotSpan --.
Col. 6 Line 61, "not language)=1" should read -- (not language)=1 --.
Col. 8 Line 19, "to" should read -- the --.
Col. 8 Line 22, "pass to" should read -- pass the --.
Col. 8 Line 61, "bypassing" should read -- by passing --.
Col. 10 Line 15, "is the" should read -- is in the --.
Col. 10 Line 18, "m" should read -- in --.

Signed and Sealed this

Twenty-fourth Day of July, 2007

JON W. DUDAS
*Director of the United States Patent and Trademark Office*